United States Patent
Rydsmo et al.

(10) Patent No.: US 8,727,061 B2
(45) Date of Patent: May 20, 2014

(54) PEDESTRIAN AIRBAG ARRANGEMENT

(75) Inventors: Erik Rydsmo, Sollebrunn (SE); Mikael Hillström, Herrljunga (SE); Ulf Magnusson, Alingsås (SE); Florian Pucher, Aufkirchen (DE); Ralf Zauritz, Holzkirchen (DE); Ulrich Koestler, Hebertshausen (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/981,714

(22) PCT Filed: Jan. 11, 2012

(86) PCT No.: PCT/SE2012/050013
§ 371 (c)(1),
(2), (4) Date: Sep. 3, 2013

(87) PCT Pub. No.: WO2012/102661
PCT Pub. Date: Aug. 2, 2012

(65) Prior Publication Data
US 2013/0333972 A1    Dec. 19, 2013

(30) Foreign Application Priority Data
Jan. 26, 2011  (EP) .................................. 11000604

(51) Int. Cl.
*B60R 21/36* (2011.01)

(52) U.S. Cl.
USPC ........................................ 180/274; 280/743.2

(58) Field of Classification Search
USPC .............................. 180/274; 280/743.2, 730.1
See application file for complete search history.

(56) References Cited

U.S. PATENT DOCUMENTS

| | | | |
|---|---|---|---|
| 6,920,954 B2* | 7/2005 | Hashimoto et al. | 180/274 |
| 7,234,727 B2* | 6/2007 | Mori et al. | 280/730.1 |
| 2013/0200603 A1* | 8/2013 | Bergenheim et al. | 280/762 |

FOREIGN PATENT DOCUMENTS

| | | |
|---|---|---|
| DE | 4320226 A1 | 1/1994 |
| DE | 10062561 A1 | 8/2001 |
| DE | 10138449 A1 | 2/2003 |
| EP | 2338745 A1 | 6/2011 |
| GB | 2477911 A | 8/2011 |
| JP | 2004-338554 A | 12/2004 |
| JP | 2006-219046 A | 8/2006 |

OTHER PUBLICATIONS

International Search Report and Written Opinion of the ISA, ISA/SE, Stockholm, mailed May 8, 2012.

* cited by examiner

*Primary Examiner* — Drew Brown
(74) *Attorney, Agent, or Firm* — Harness, Dickey & Pierce, P.L.C.

(57) ABSTRACT

A pedestrian airbag arrangement for a vehicle includes an airbag covering at least a part of the windscreen and/or at least a part of at least one A-pillar of the vehicle when it is in deployed state, an inflator in fluid connection to the airbag, and a retraction means for retracting the airbag. The retraction means includes a triggering means and a retractor retracting the airbag when released by the triggering means. In order to provide an automatic retraction of the airbag, the triggering means is activated by the airbag.

14 Claims, 10 Drawing Sheets

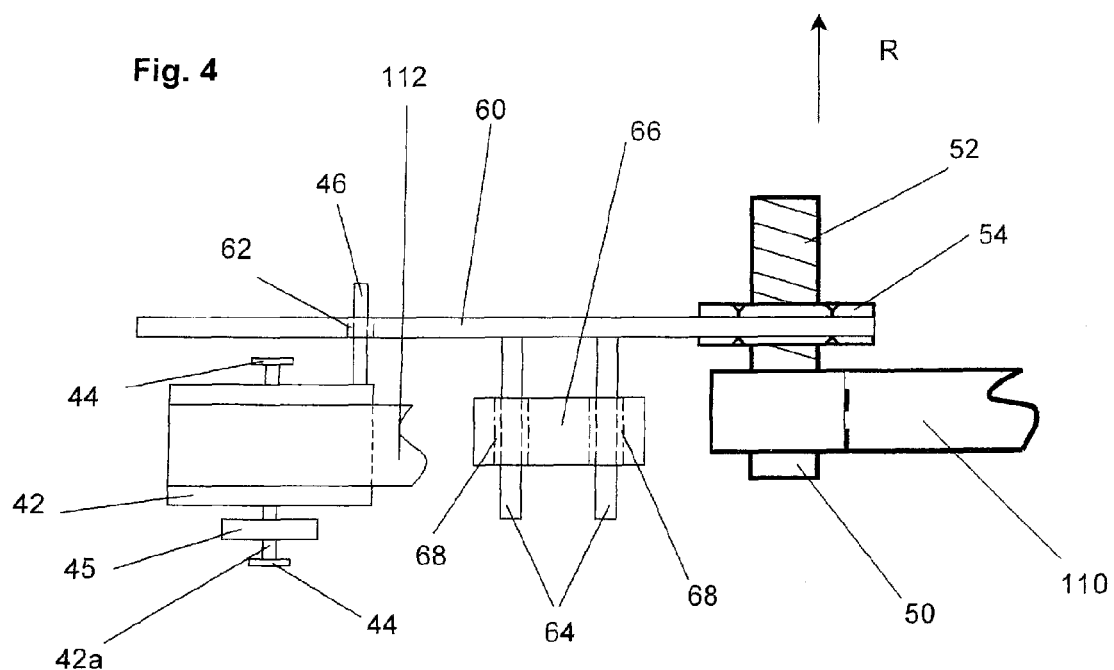
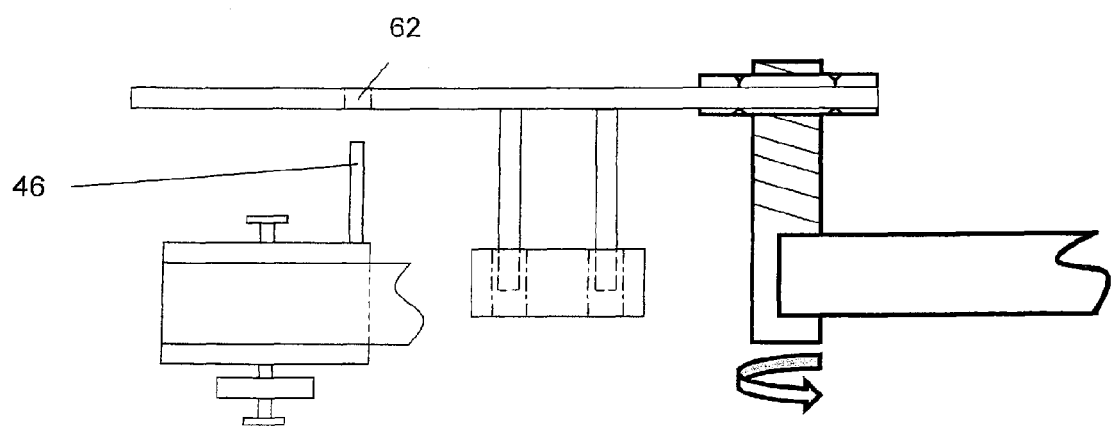

PEDESTRIAN AIRBAG ARRANGEMENT

CROSS-REFERENCE TO RELATED APPLICATIONS

This application is a 371 U.S. National Stage of International Application No. PCT/SE2012/050013, filed Jan. 11, 2012, which claims priority to European Patent Application No. EP 11000604.6, filed Jan. 26, 2011. The disclosures of the above applications are entirely incorporated by reference herein.

TECHNICAL FIELD OF THE INVENTION

When a motor vehicle is involved in a head-on collision with a pedestrian, the body and/or head of the pedestrian often strikes the windscreen of the vehicle. This can result in serious injury to the pedestrian, and significant damage to the vehicle.

In order to better protect the pedestrian, it has been proposed to provide a pedestrian airbag which, if vehicle sensors indicate that a relevant collision with a pedestrian is occurring or is likely to occur, inflates to cover a central portion of the windscreen, and/or the left and right A-pillars of the vehicle. Typically, the air-bag is stored beneath a rear edge of the vehicle's bonnet, or beneath a cowl which is provided between the base of the windscreen and the rear of the bonnet. The rear of the bonnet may be lifted, by a suitable air-bag, piston or other arrangement, to allow sufficient space for the air-bag to inflate.

The aim of a pedestrian airbag of this type is to provide an inflated cushion over the windscreen and/or A-pillars of the vehicle, thus cushioning the impact of a pedestrian with these parts of the vehicle.

One potential problem that can occur with the use of airbags of this type is that, once the airbag has been inflated, the driver of the vehicle is hindered to look out of the windscreen. If a vehicle collides with a pedestrian with sufficient force that the pedestrian strikes the windscreen of the vehicle, the vehicle is likely to be travelling at a considerable speed. If a pedestrian airbag inflates while the vehicle is travelling at speed, and subsequently obscures the driver's view for a long period of time, the result may be that the driver fails to avoid one or more further objects or hazards before bringing the vehicle to a complete stop.

PRIOR ART

One solution to this problem is presented in the generic JP 2006219046. This document discloses a pedestrian air-bag which has a pair of straps, which are attached to upper left and right corners of the air-bag. As the air-bag inflates the straps are drawn from a reel whereat tensioning a spring being connected to the reel such that the spring is stressed while the airbag is deploys. A locking device prevents the reel from turning into the unloading direction of the spring. The locking device can be brought into an unlocking state by means of a manually activated trigger. After manually activating the trigger, the deflating airbag is drawn from the windscreen allowing the driver to see clearly out of the windscreen again.

The problem of the solution presented in this document is, that usually the driver who is involved in a accident is too busy or too confused to operate the trigger in an early stage of the accident where it would be necessary.

SUMMARY OF THE INVENTION

It is an object of the present invention to provide an improved pedestrian airbag arrangement of the generic type.

The airbag arrangement according to the invention comprises an airbag covering at least a part of the windscreen and/or at least a part of at least one A-pillar of the vehicle when in deployed state, an inflator being in fluid connection to said airbag, and a retraction means for retracting said airbag, said retraction means comprising a triggering means and a retractor retracting the airbag when released by the triggering means. In order to solve the above defined problem, the triggering means is activated by the airbag.

The basic idea of this invention is to provide a triggering means which is automatically activated, namely by the deploying airbag. This means that the triggering means does not need a separate triggering signal especially in form of an electrical signal on the one hand but also no manual triggering on the other hand. This has several advantages: Since the triggering occurs automatically, the retraction of the airbag from the windscreen occurs to a predetermined time, especially not too late. Because it is not necessary to provide an electrical wiring the mounting is easy and cost-effective since the triggering means does not need to be connected to the electrical system of the vehicle. Further, the triggering of the retraction means by the deploying airbag makes the retraction means very reliable since there is no risk that the retraction means fail because of a broken electrical connection.

Preferably, the triggering means is connected to the airbag via a pull element like a strap. This pull element is called activation pull element. Usually, the retractor means is connected to the airbag also via a pull element like a strap. This pull element is called retraction pull element The retractor can especially comprise a spring biased reel. That means that a spring acting on this reel is provided with the spring being pre-loaded in the initial state of the retractor.

In the first basic concept the activation pull element and the retraction pull element are separate elements. This has the advantage that this may make it easier to adapt the retraction means more easily to the given geometry.

In a second basic concept the activation pull element and the retraction pull element are the same pull element. This has the advantage that fewer parts are needed.

It can in some applications be preferred that the retraction means, usually via the retraction pull element, does also influence the ventilation of the airbag, especially that it opens a ventilation opening. In this case the airbag is at the same time ventilated and retracted, leading to a quicker removal of the airbag from the windscreen.

Preferred embodiments and further advantages of the invention result from further sub-claims as well as from the preferred embodiments described hereinafter.

The invention will now be described by means of preferred embodiments in view of the accompanying drawings.

The drawings show:

DETAILED DESCRIPTION OF PREFERRED EMBODIMENTS

First Basic Concept

Figure 1:
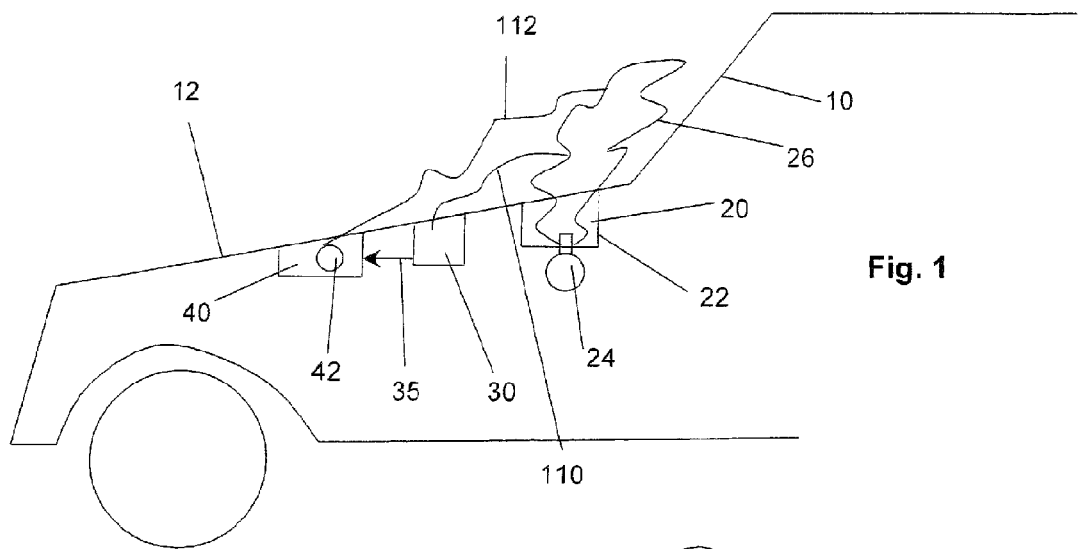
FIG. 1 the front of a passenger car with a retraction means according to a first basic concept of the invention in an early deployment phase of the airbag in a schematic representation, FIG. 2 what is shown in FIG. 1 when the airbag is fully deployed, FIG. 3 what is shown in FIG. 2 after the airbag has been retracted, FIG. 4 a retraction means that could be used in the first concept in a state where the retractor is locked, FIG. 5 what is shown in FIG. 4 after the retractor has been unlocked by a triggering device, FIG. 6 a second basic concept of the invention in a representation according to FIG. 1, FIG. 7 what is shown in FIG. 6 in a state when the airbag is fully deployed, FIG. 8 what is shown in FIG. 7 after the airbag has been retracted, FIG. 9 a triggering and retraction device which could be used in the second basic concept, FIG. 10 a triggering and retraction device according to a second embodiment in a perspective representation, FIG. 11 what is shown in FIG. 10 in another angle of view, FIG. 12 what is shown in FIGS. 10 and 11 after the retractor has been released by the triggering means, FIG. 13 what is shown in FIG. 12 viewed from another angle, partially exploded FIG. 14 a third embodiment of a triggering and retraction device in a locked state, FIG. 15 what is shown in FIG. 14 in an unlocked state, FIG. 16 a section of an airbag with a ventilation opening being covered by the end of a strap, FIG. 17 what is shown in FIG. 16 after the ventilation opening has been opened, FIG. 18 a fourth embodiment of a combined triggering and retraction device in a sectional view, FIG. 19 what is shown in FIG. 18 viewed from direction A, FIG. 20 a fifth embodiment of a combined triggering and retraction device, FIG. 21 a sixth embodiment of a combined triggering and retraction device, FIG. 22 a top end of an airbag in a not completely deployed state and FIG. 23 a variation of what is shown in FIG. 22.
Figure 2:
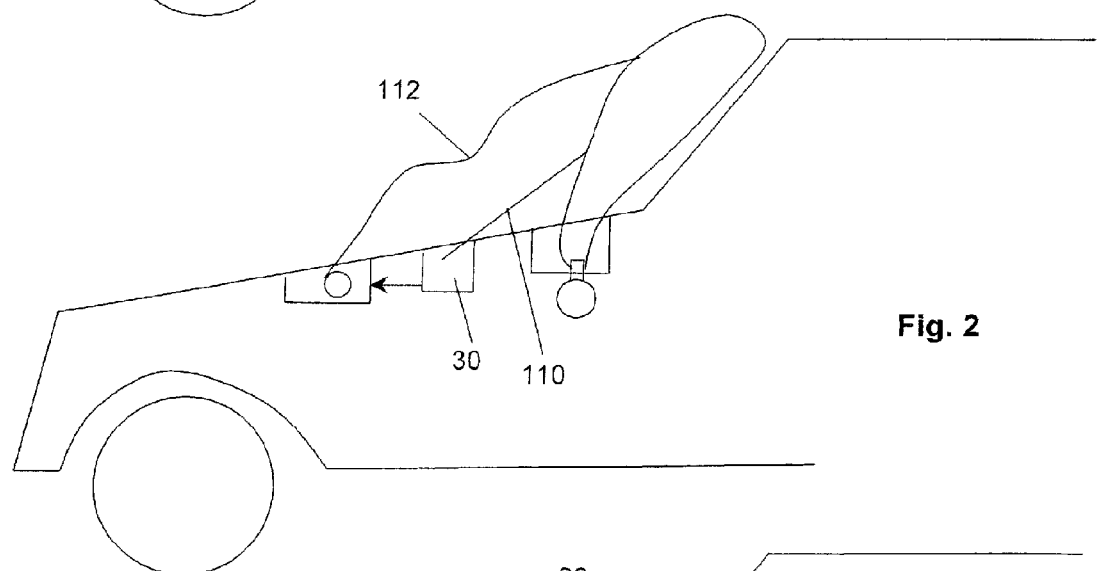
Figure 3:
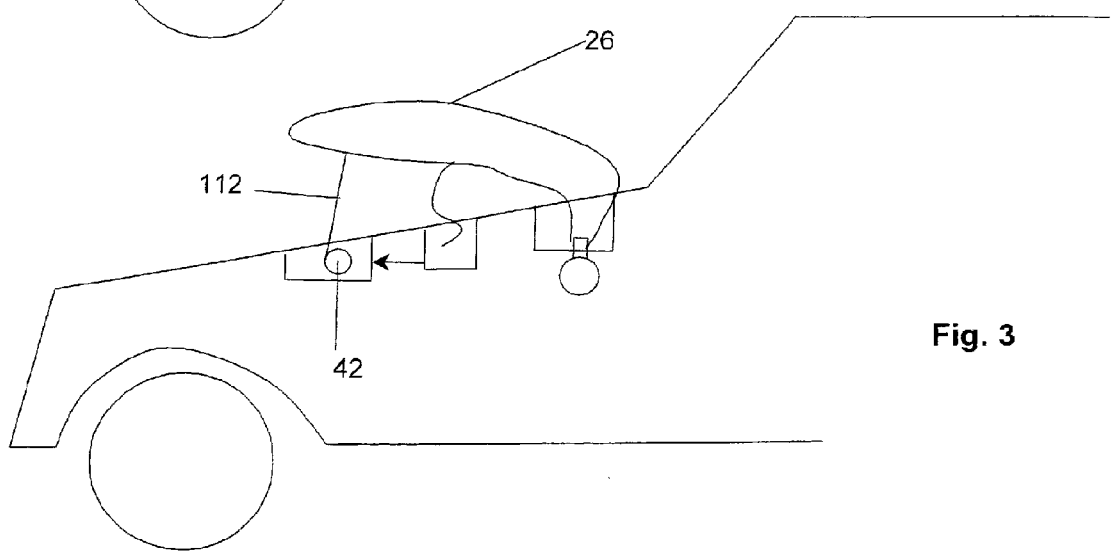

The FIGS. 1 to 3 show a front part of the vehicle. A pedestrian airbag device is provided as is generally known in the art. This pedestrian airbag device comprises an airbag module 20 having a housing 22, a gas generator 24 and an airbag 26. This airbag 26 is arranged and configured in order to cover at least a part of the windscreen 10 and/or one or both of the A-pillars. The housing can be located beneath the bonnet 12 or in a space between the rear end of the bonnet and the windscreen. This is not described in detail since this concept is known in the prior art.

In order to remove the airbag 20 from the windscreen at least in parts after it has been fully deployed in order to make it possible for the driver to look through the windscreen so that he may prevent a further accident, a retraction means for retracting said airbag is provided. This retraction means comprises a retractor 40 for retracting the airbag 26 and triggering means for triggering—this means releasing—the retractor 40. The retractor 40 in this embodiment comprises a spring biased reel 42. This means that the spring acting on the reel is pre-loaded in the initial state. A first end of a retraction strap 112 forming the retraction pull element is connected to an upper area of the airbag 26, the second end of this retraction strap 112 is connected to this spring biased reel 42 of the retractor. In the first basic concept described in FIGS. 1 to 3 a separate retractor 40 and a separate triggering device 30 are present. The triggering device 30 and the retractor 40 are connected via a mechanical connection. This mechanical connection is represented by the arrow 35. An activation strap 110 forming the activation pull element connects the triggering device 30 with the airbag 26. The activation strap 110 can be attached to the same point of the airbag as the retraction strap 112 or, as shown, to another point.

As one can see from FIG. 2 the activation strap 110 (forming the activation pull element) is tensioned when the airbag is fully deployed and thus a force is applied from the airbag 26 via the activation strap 100 to the triggering device 30. In this state the retraction starp 112 may not be tensioned. By this force the triggering device 30 is activated and triggers the retractor 40 via the mechanical connection 35. By selecting the length of the activation strap 110, one can determine at which deployment stage (at which position of the airbag) the triggering means is activated by the airbag.

After the retractor 40 has been triggered, the spring-biased reel 42 is released, the retraction strap 112 is wound onto a reel 42 and so the airbag 26 is pulled away from the windscreen.

One can see that the retraction means being comprised of the retractor 40, the triggering device 30, and the mechanical connection acting between the triggering device 30 and the retraction device 40 is independent from the electrical system of the vehicle and is exclusively controlled in a mechanical way by the deployment of the airbag 26 via the activation strap 110.

The FIGS. 4 and 5 show an embodiment how the triggering device 30, the retractor 40 and mechanical connections 35 can be made:

The triggering device 30 comprises a bolt 50 that has a thread 52 at one end. A nut 54 is threaded on this thread 52 and the activation strap 110 is wound on the bolt 50. A bar 60 forming the mechanical connection is rigidly connected to the nut 54. Two guiding cylinders 64 extend from the bar 60 parallel to the bolt 50 into guiding bores 68 of a guiding block 66. So, the bar 60 cannot pivot but only move into the axial direction of the bolt 50. The bar 60 further comprises a locking bore 62.

The retractor 40 has a reel 42 whose axis 42a is rotary held in bearings 44. The axis 42a and the reel 42 are rigidly connected to each other. A pre-loaded constant force spring 45 acts on the axis 42a in a known manner. The retraction strap 112 is connected to the reel 42. Finally, a locking pin 46 is connected to the reel 42 and extends through the locking bore 62 of the bar 60.

When the airbag 26 pulls on the activation strap 110, the activation strap 110 is unwound from bolt 50. Since the nut 54 cannot rotate the nut 54 and the bar 60 move into the axial direction R and so the locking pin 46 is released from the locking bore 62 leading to a release of the reel 42 which is then driven by the constant force spring 45 and winds the retraction strap 112. One can see that there is a certain time delay between the initial strengthening of the activation strap 110 and the release of the retractor 40.

Second Basic Concept

Figure 6:
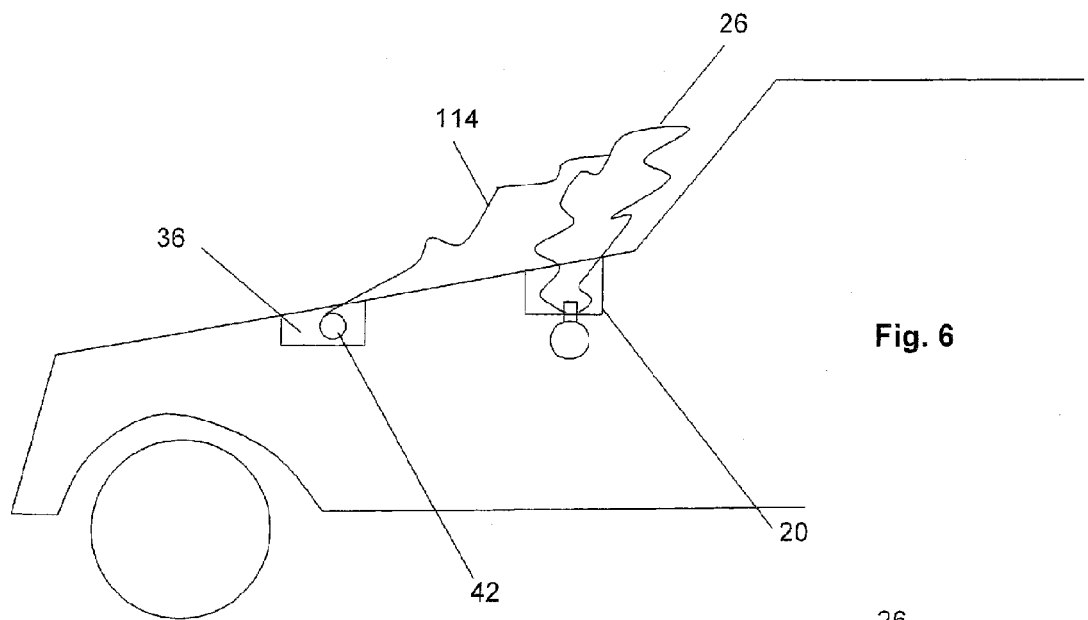
Figure 7:
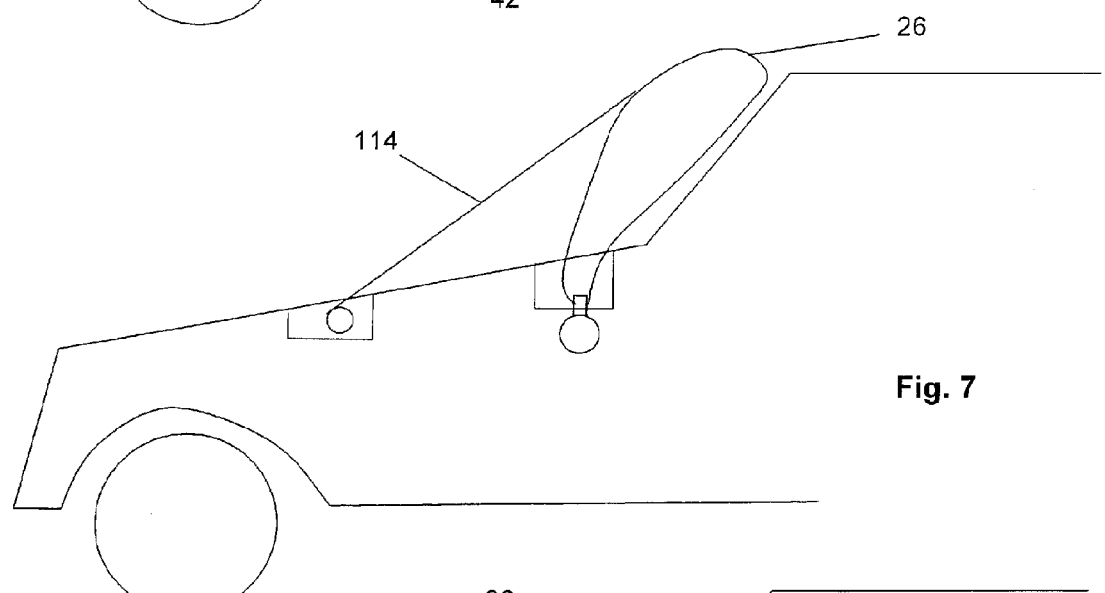
Figure 8:
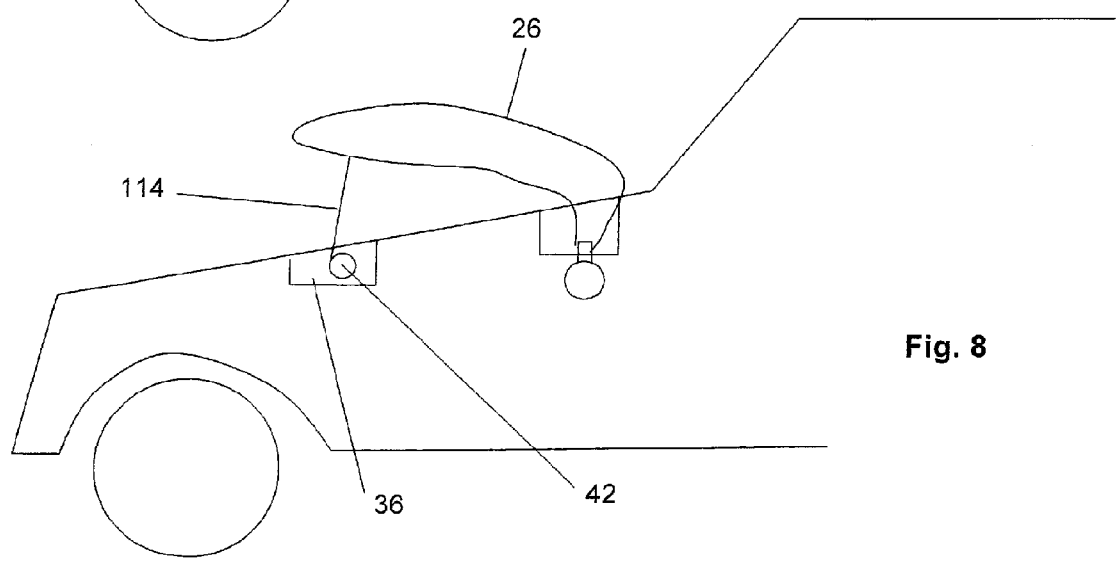

The FIGS. 6 to 8 show a second basic concept. Here, the triggering means is not located in a separate triggering device, here only one combined triggering and retraction device 36 is present combining both: the retractor and the triggering means. Also, only one sole strap 114 is provided instead of a separate activation strap and separate retraction strap. This sole strap 114 serves as activation pull element as well as retraction pull element. Once the sole strap 114 is tensioned (FIG. 7) the sole strap 114 activates the triggering means that trigger the retractor which can also comprise a spring-biased reel 42.

Figure 9:
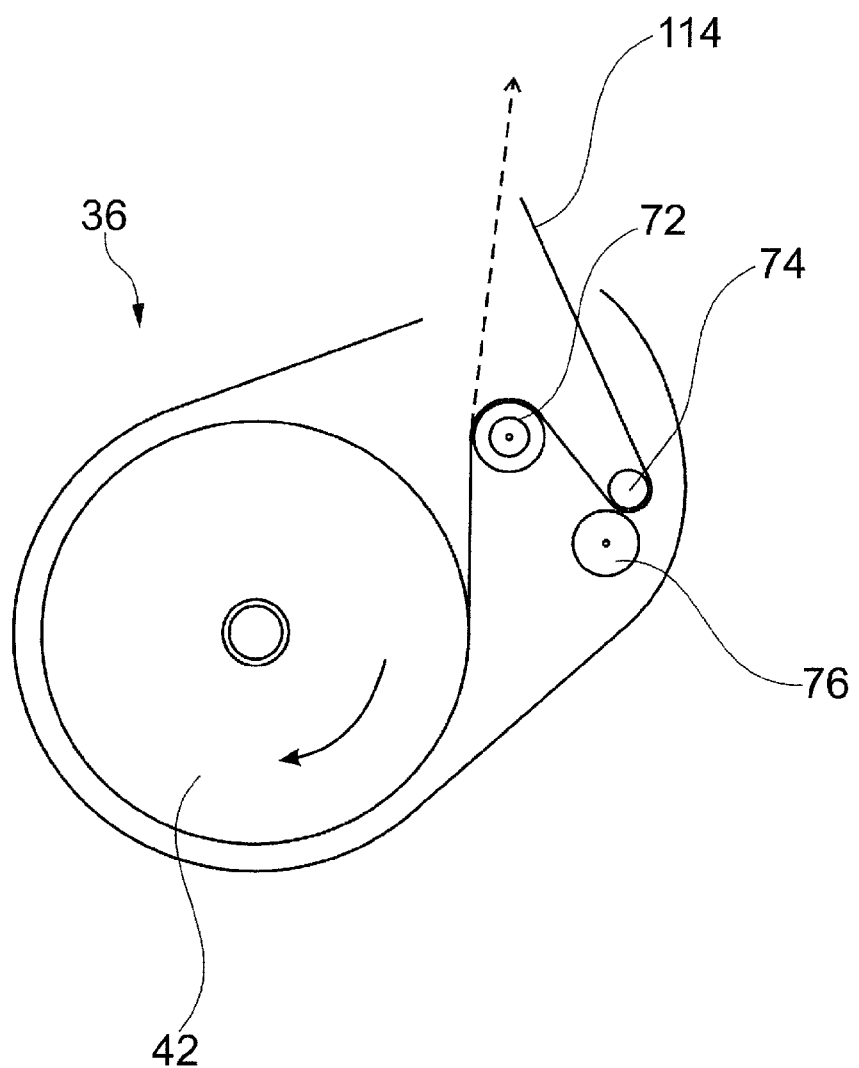

FIG. 9 shows a first embodiment of such a combined triggering and retraction device 36 in a schematic representation.

The sole strap 114 is wound on the spring-biased reel 42 of the retractor, deflected by a deflector roller 72 and clamped between a locking member 76 and a release member 74. The release member 74 is preferably breakable when the force applied to it is higher than a certain threshold value, but it can also be a pivotable or displaceable element which is removed from the locking member 76 when the force applied to it reached a predetermined value. By the clamping of the sole strap 114 between the release member 74 and the locking member 76 in the initial state, the spring-biased reel 42 is locked by the sole strap 114 itself. When the airbag is fully deployed (FIG. 7), a tensile force is applied to the sole strap 114 and the sole strap 114 applies force to the release member 74 which then breaks. After this, the reel 42 is unlocked and winds the sole strap 114 which retracts the airbag (see FIG. 8). The dashed line in FIG. 9 shows the position of the sole strap 114 after the release member 74 serving as the triggering means was broken by the sole strap 114.

Figure 10:
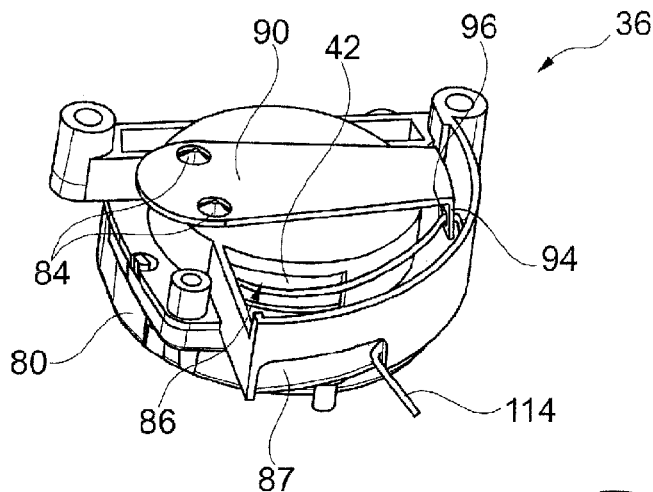
Figure 11:
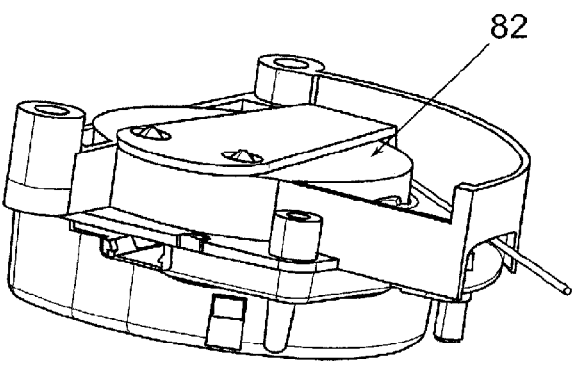
Figure 12:
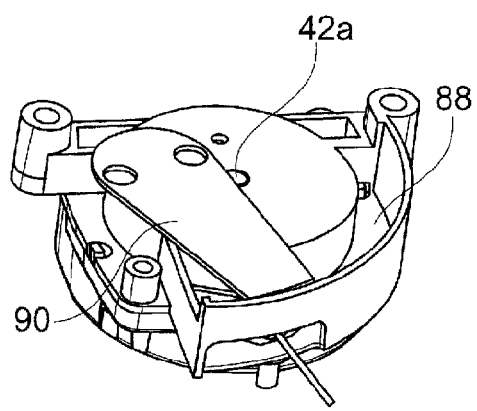
Figure 13:
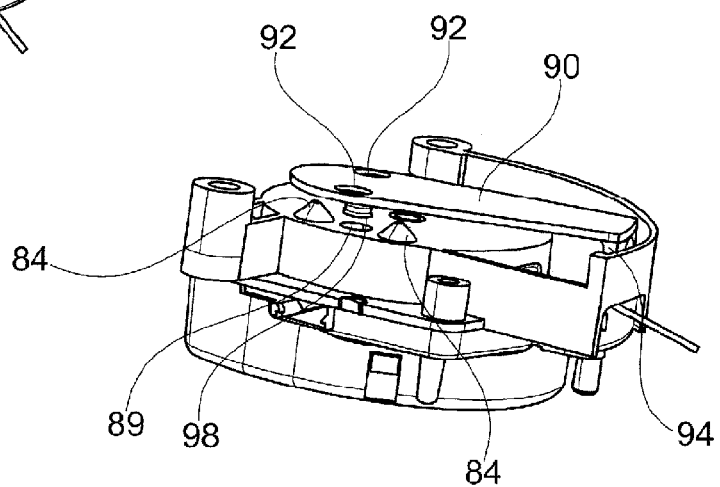

The FIGS. 10 to 13 show a second embodiment of a combined triggering and retraction device 36. This combined retraction and triggering device 36 comprises a housing 80 in which a spring biased reel 42 serving as retractor is accommodated. As in the other embodiments described, a sole strap 114 is wound onto this spring biased reel 42. The axis 42a of this reel 42 extend through the face side 82 of this housing as can be seen in FIG. 12. At some distance from this axis 42a two cone shaped protrusions 84 extend from the face side 82 of the housing 80 in axial direction of this axis 42a. A first opening 86 and a second opening 87 are provided in the housing 80 and the groove 88 is provided between these two openings and encircling approximately a quarter of the circumference of the housing.

A locking arm 90 is pivotably held on the face side 82 of the housing by means of a bearing pin 98 which extends from the locking arm into a bearing hole extending into the face side 82 of the housing 80 between the two cone shaped protrusions 84. The cone shaped protrusions 84 extend through bores 92 of this locking arm 90. The end 94 of the arm extends vertically from the main part of the locking arm 90 into the groove 88 and shows an ear 96 through which the sole strap 114 projects. So, the sole strap 114 is guided from the first opening 86 through the ear 96 and from there through the second opening 87.

In the initial state shown in the FIGS. 10 and 11, the locking arm 90 which servers as the triggering means, is lying onto the face side 82 of the housing 80. In this state the axis 42a of the reel 42 is locked by the locking arm 90. For this purpose the side of the locking arm 90 showing towards the face side 82 of the housing has a locking section locking the axis 42a. This locking section cannot be seen in the drawings due to the chosen representation. When force is applied to the sole strap 114 because of the deploying airbag, the sole strap 114 pivots the locking arm 90 into the position shown in FIG. 12. Because of this pivotal movement the locking arm 90 is raised due to the cone shaped protrusions 84. By this raising of the locking arm 90, the locking section of the locking arm 90 loses contact to the axis 42, the spring biased reel 42 is unlocked and the sole strap 114 is wound onto the reel.

Figure 14:
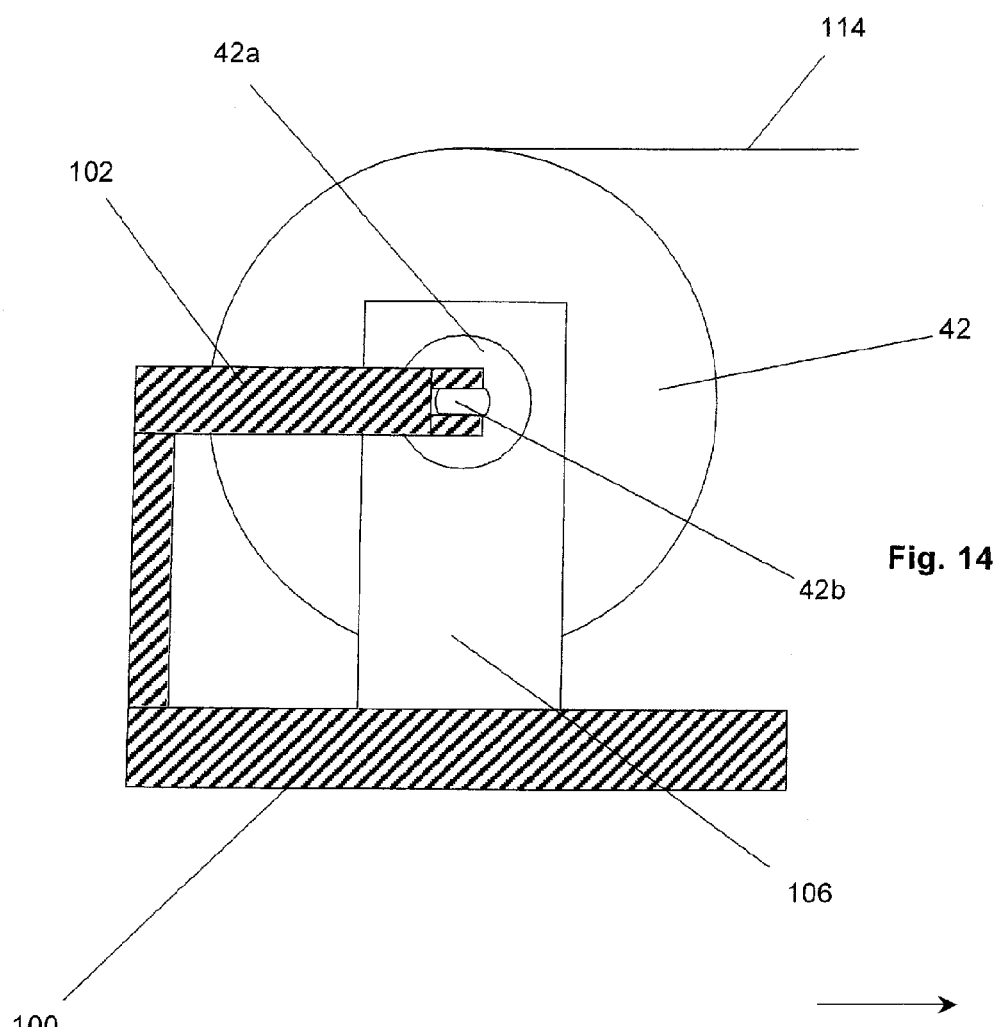
Figure 15:
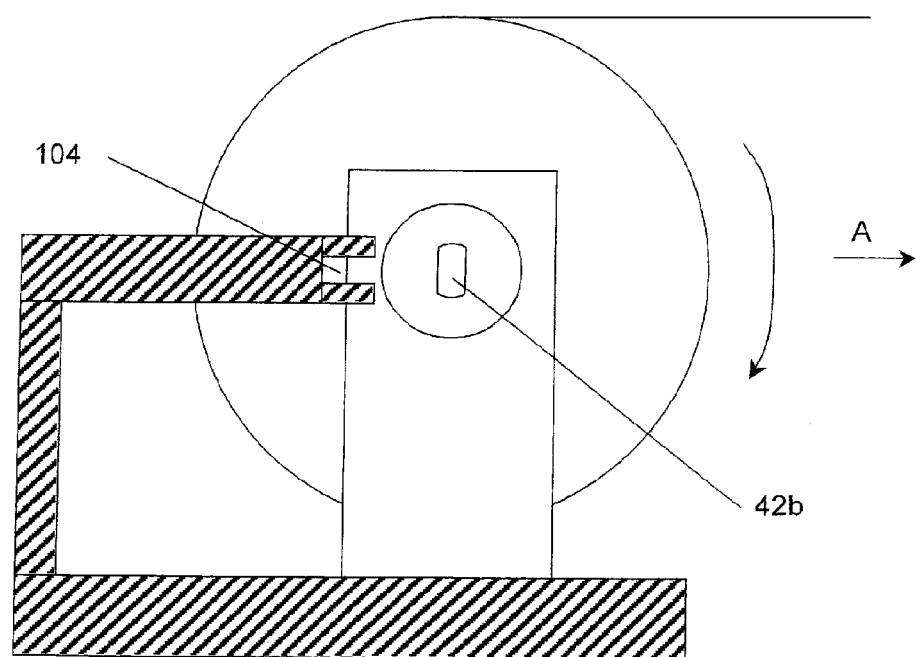

The FIGS. 14 and 15 show a third embodiment of a combined triggering and retraction device. Here, the spring biased reel 42 is mounted on a carrier 106 through which the axis of the spring biased reel 42 (the spring is not shown in the figures) extends. This carrier is movable in direction A on a base 100. The axis 42a has flat ends 42b which are held in the initial state in locking grooves 104 of a locking bar 102 being rigidly connected to the base 100. As in the last two embodiments the sole strap 114 is wound onto the spring biased reel which is locked in the initial state because the flat ends 42b are held in locking grooves 104.

When force is applied by the sole strap 114 onto the spring biased reel 42 due to the deploying airbag the reel 42 moves into direction A, the flat ends 42b leave the locking grooves 104, the spring biased reel 42 is unlocked and winds the sole strap 114. Here, the movable spring biased reel 42 is both: a part of the retractor and a part of the triggering means.

Figure 16:
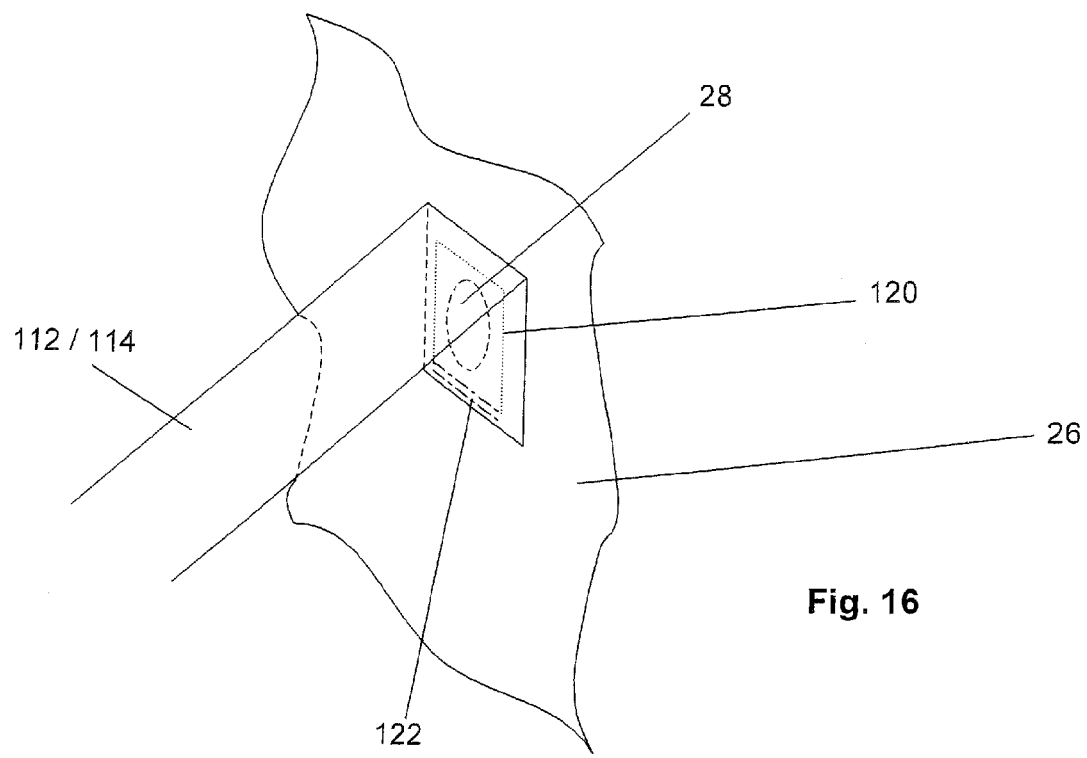
Figure 17:
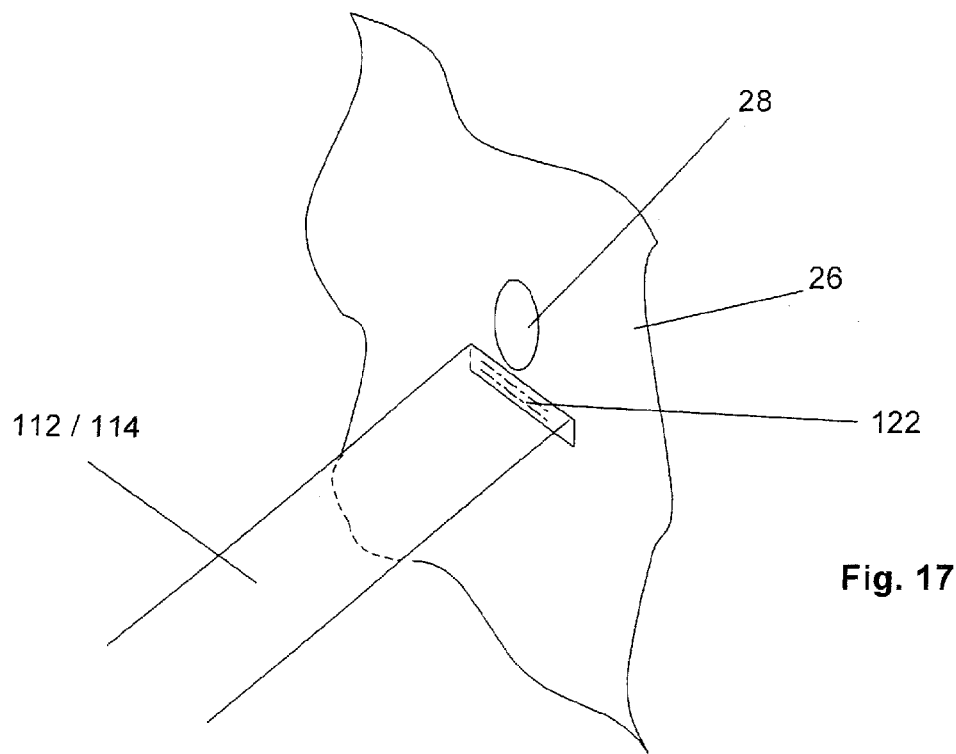

In order to remove the airbag more quickly from the windscreen it can be preferred that the airbag is vented when retracted. A possibility how this can be achieved in an easy and safe way is shown in FIGS. 16 and 17. The retraction strap 112 or the sole strap 114 (depending on the embodiment) is sewn to the airbag via two different seams namely a permanent seam 122 and a tear seam 120. A ventilation hole 28 is encircled by the tear seam 120 and when force is applied to the retraction strap/the sole strap by the retractor, the tear seam breaks and opens the ventilation hole 28 while the permanent seam 122 stays intact (FIG. 17), so that the ventilation and the pulling away of the airbag from the windscreen occurs simultaneously.

Figure 18:
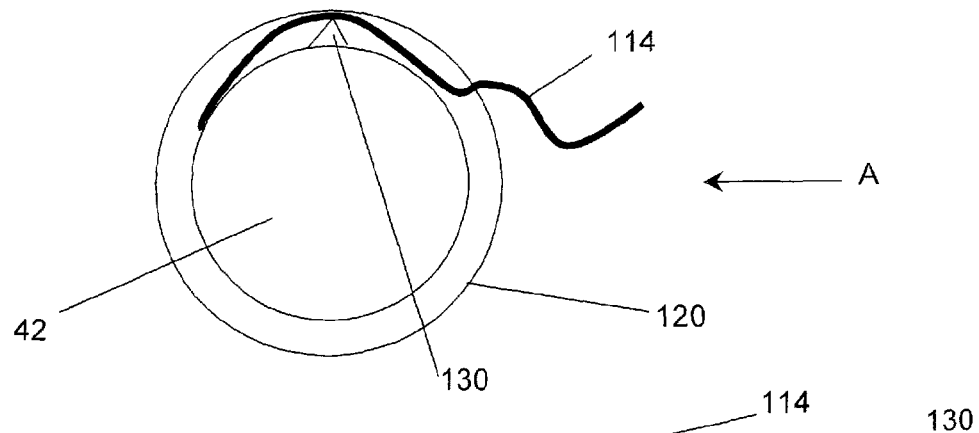
Figure 19:
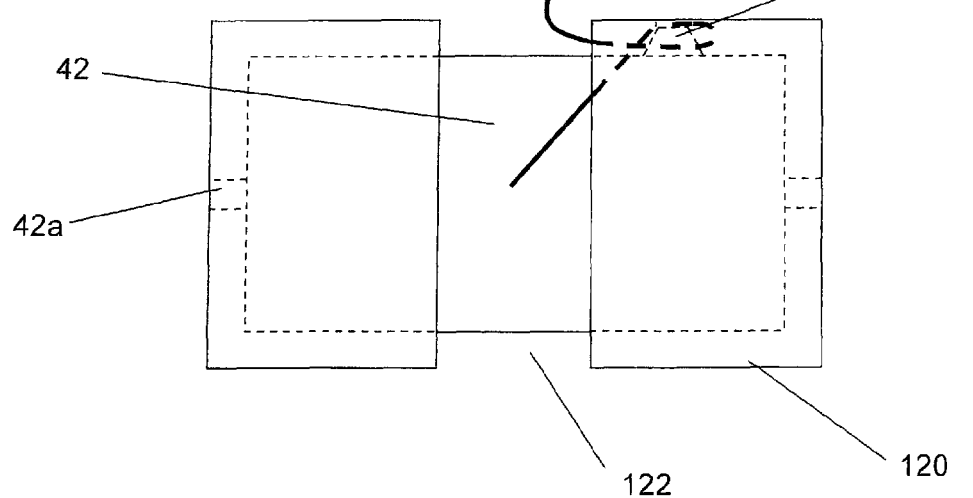

The FIGS. 18 and 19 show another embodiment of a combined triggering and retraction device which is in some respect similar to the one shown in FIGS. 10 to 13. Here, the reel 42 is held in a housing 120 with the housing being basically in a shape of a hollow cylinder in which the reel 42 is at least partially held in an coaxial way. This can be seen best in FIG. 18. The coaxial housing 120 shows an opening 122, through which the sole strap 114, which is fixed to the reel 42, extends. In an area, where the reel 42 is located inside the housing, the reel 42 has a clamping protrusion 130 whose dimensions are such that it extends close to the inner surface of the housing 120 but is not in contact with the same. In the initial state shown in FIGS. 18 and 19 the sole strap 114 extends from the reel 42 to said clamping protrusion 130 and a section of the sole strap 114 is located between the said clamping protrusion 130 and the inner side of the housing 120, such that clamping occurs. From the clamping protrusion 130 the sole strap 114 extends to the airbag 26 as the described above. A pre-loaded spring is acting on the axis 42a of the reel 42 as is also described above (not shown in the Figures). Because a section of the sole strap 114 is located between the clamping protrusion and the inner wall of the housing clamping occurs and the reel 42 can not rotate. When the airbag deploys a pulling force is applied to the sole strap 114, such that it is pulled away from the clamping protrusion so that no more clamping exists, the reel 42 rotates and the sole strap 114 is spooled onto the reel 42 as described above.

Figure 20:
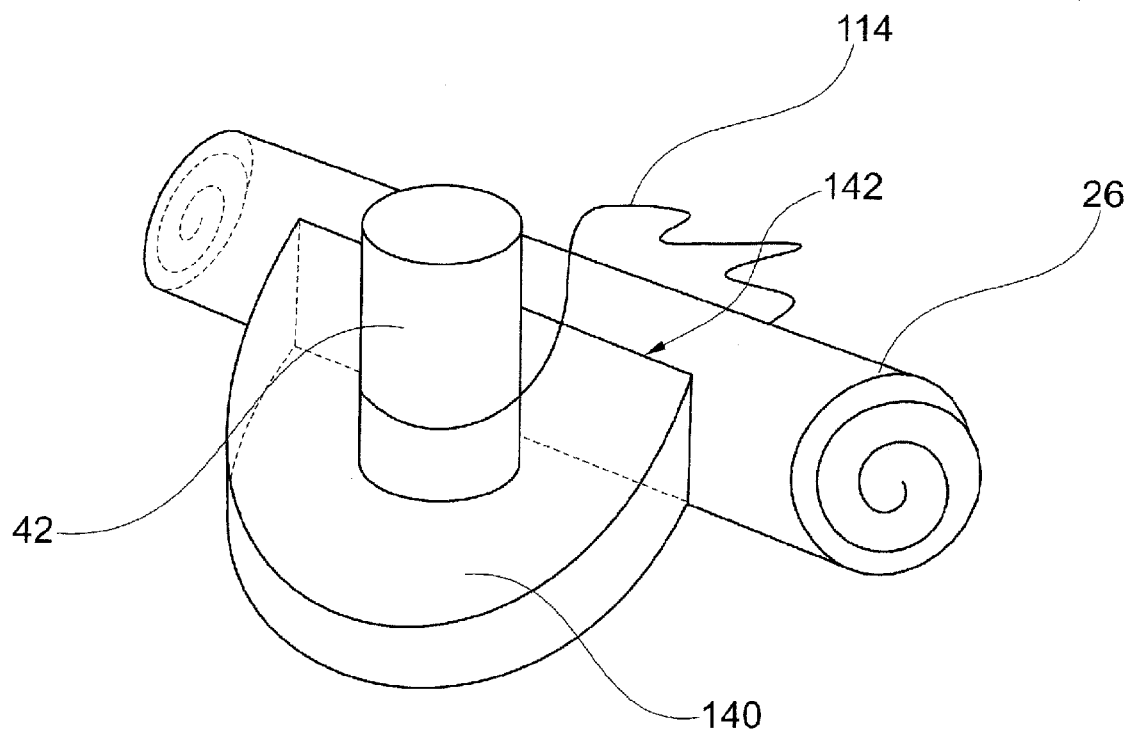

The FIG. 20 shows an embodiment in which the reel 42 is directly blocked by the airbag 26. For this purpose the reel 42 is rigidly connected to a blocking part 140 which has a flat surface 142. This flat surface 142 lies against the airbag package, such that this blocking part 140 and thus the reel 42 cannot rotate, as is shown in FIG. 20. The geometry is chosen such that when the airbag is deployed the blocking part 140 is no longer blocked by the airbag package so that it can rotate. As an alternative the flat surface 142 can lie against a filling channel of the airbag, such that it is blocked as long as the airbag is in form of a package or the filling channel stays under pressure, such that the pulling back of the airbag does not take place before the airbag starts to lose its pressure. A pre-loaded spring is acting on the axis of the reel (not shown in the Figures).

Figure 21:
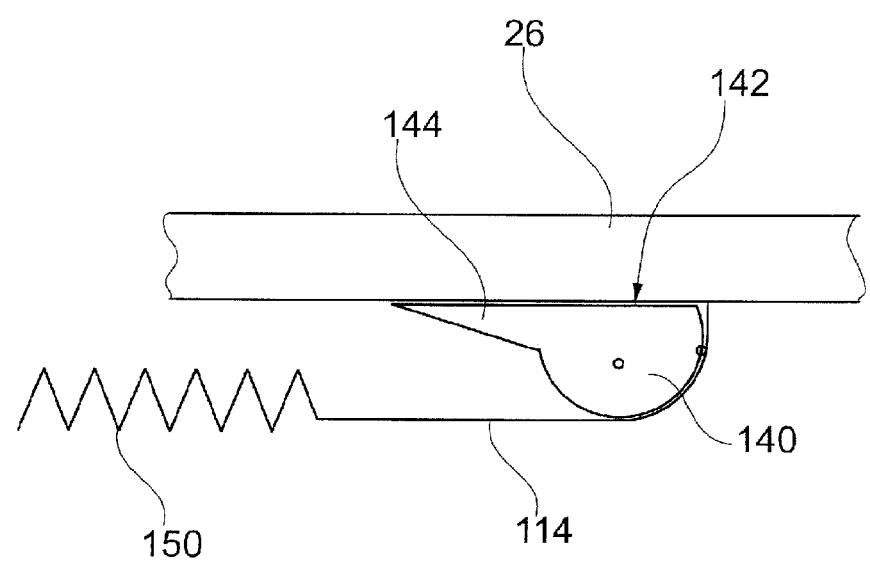

FIG. 21 shows an embodiment which is to some respect similar to the one shown in FIG. 20. Here, we have a rotatable blocking part 140 with a flat surface 142 and an arm 144. As in the embodiment in FIG. 20 this blocking part is blocked as long as the airbag is not deployed, since the flat surface lies against the airbag package. The sole strap 114 is rigidly connected to the blocking part 140 and extends further to a spiral spring 150. When the airbag is deployed the blocking part 140 can rotate and the necessary pulling force is basically applied to the sole strap 114 by the arm 144. Additionally a pre-loaded spring can act on the axis of the reel (not shown in the Figures).

Figure 22:
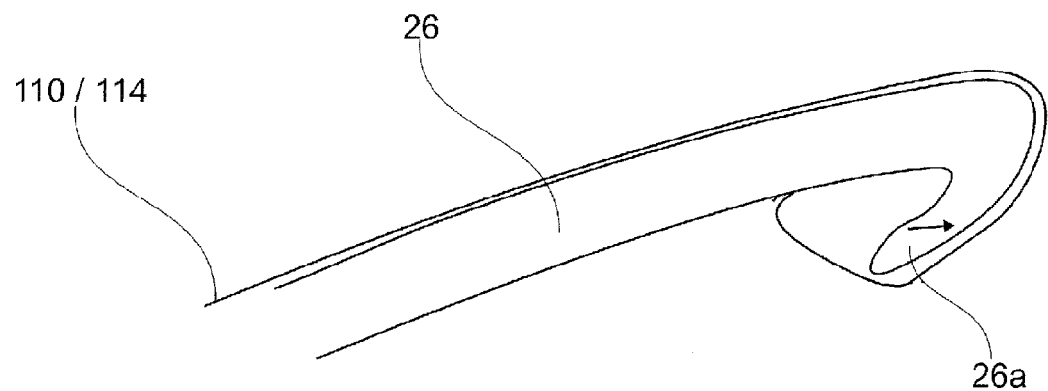

FIG. 22 shows a possibility how one can make sure that the triggering by the activation strap 110 or the sole strap 114 does not take place before the airbag 26 is completely deployed. For this purpose the activation strap 110 or sole strap 114 encircles the top end 26a of the airbag as is shown in FIG. 22. One can see clearly from the figure that this airbag will not apply its full force to the strap before the airbag 26 has reached its completely deployed state.

Figure 23:
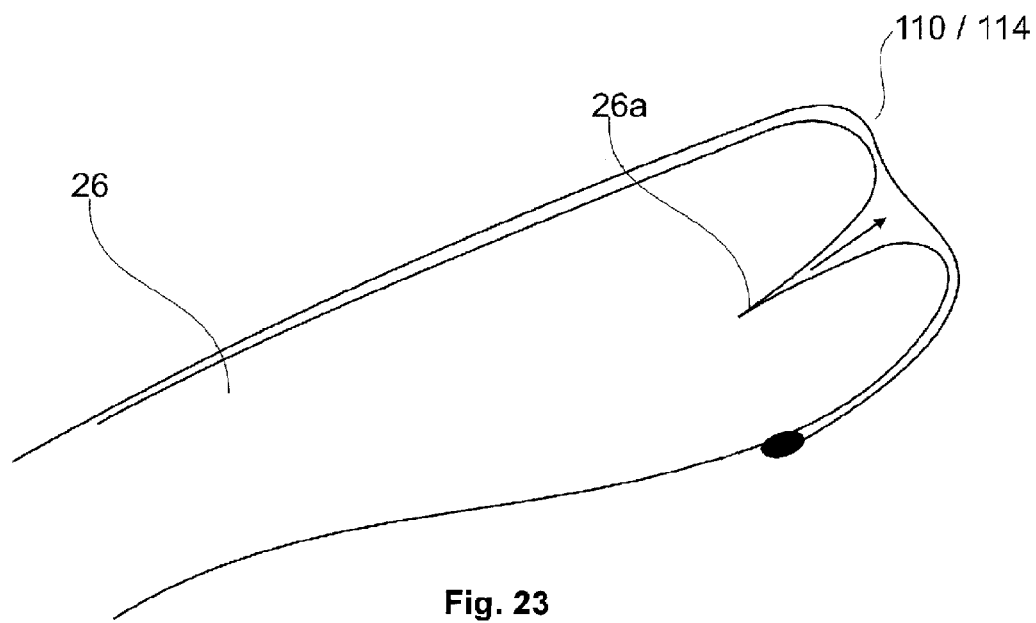

FIG. 23 shows an alternative to what is shown in FIG. 22. Here, the top end of the airbag 26 is folded inside the airbag.

LIST OF REFERENCE NUMBERS 10 windscreen
12 bonnet
20 Airbag module
22 housing
24 gas generator
26 airbag
26a top end
30 triggering device
35 mechanical connection
36 combined triggering and retraction device
40 retractor
42 reel
42a axis
42b flat end
44 bearing
45 constant force spring 45
46 locking pin
50 bolt
52 thread
60 bar
62 locking bore
64 guiding cylinder
66 guiding block
68 guiding bore
70 sole pull element
72 deflector role
74 release member
76 locking member
80 housing
82 face side
84 cone shaped protrusion
86 first opening
87 second opening
88 groove
89 bearing hole
90 locking arm
92 bore
94 end of the arm
96 ear
98 pin
100 base
102 locking bar
104 locking groove
106 carrier
110 activation strap
112 retraction strap
114 sole strap
120 coaxial housing
122 opening
130 clamping protrusion
140 blocking part
142 flat surface
144 arm

The invention claimed is:

1. A pedestrian airbag arrangement for a vehicle having a windscreen, the arrangement comprising:
   a pedestrian airbag covering at least a part of the windscreen and/or at least a part of at least one A-pillar of the vehicle when in deployed state;
   an inflator in fluid connection to the airbag; and
   a retraction means for retracting the airbag, the retraction means including a triggering means and a retractor retracting the airbag when released by the triggering means, the triggering means activated by the airbag.

2. The pedestrian airbag according to claim 1, wherein the triggering means is activated by a force occurring on inflation of the airbag.

3. The pedestrian airbag according to claim 1, wherein the triggering means is activated when a defined section of the airbag reaches a predetermined position.

4. The pedestrian airbag according to claim 1, wherein the retractor includes a pre-loaded spring element.

5. The pedestrian airbag according to claim 4, wherein the retractor includes a reel and the spring element is a constant force spring acting on the reel.

6. The pedestrian airbag according to claim 1, wherein the airbag is connected to the triggering means via an activation pull element.

7. The pedestrian airbag according to claim 6, wherein the activation pull element is connected to a pivotable, displaceable or breakable member being a part of the triggering means.

8. The pedestrian airbag according to claim 6, wherein the triggering means includes a rotary mounted bolt having a thread and a nut threaded onto the thread and being non-rotary mounted such that the nut is displaced in an axial direction when the bolt rotates, wherein the activation pull element is partially wound onto the bolt or an element being in fixed connection to the bolt.

9. The pedestrian airbag according to claim 1, wherein the airbag is connected to the retractor via a retraction pull element.

10. The pedestrian airbag according to claim 9, wherein the activation pull element and the retraction pull element are a common pull element.

11. The pedestrian airbag according to claim 9, wherein the activation pull element and the retraction pull element are different pull elements.

12. The pedestrian airbag according to claim 1, wherein the airbag retraction means also influence ventilation of the airbag.

13. The pedestrian airbag according to claim 1, wherein the triggering means includes a mechanical delay.

14. A pedestrian airbag arrangement for a vehicle having a windscreen, the arrangement comprising:
   a pedestrian airbag covering at least a part of the windscreen and/or at least a part of at least one A-pillar of the vehicle when in deployed state;
   an inflator in fluid connection to the airbag; and a triggering device and a retractor retracting the airbag when released by the triggering device, the triggering device activated by the airbag.

\* \* \* \* \*